INVENTOR.
LLOYD D. MASSER
ATTORNEYS

INVENTOR.
LLOYD D. MASSER
BY
*Barnes, Kisselle, Raisch & Choate*
ATTORNEYS

United States Patent Office 3,163,092
Patented Dec. 29, 1964

3,163,092
BRAKE OPERATING STRUCTURE
Lloyd D. Masser, Muskegon, Mich., assignor to Neway Equipment Company, Muskegon, Mich., a corporation of Michigan
Filed Oct. 28, 1960, Ser. No. 65,839
4 Claims. (Cl. 92—94)

This invention is particularly adapted for use in operating air brakes in heavy duty motor vehicles.

The object of the invention is to provide a relatively inexpensive brake operating structure which is more compact than conventional structures and which has improved operating characteristics.

In general, the invention is carried out by providing in combination with a source of air under pressure, a double acting pneumatic motor in which the piston has different effective areas exposed to the two pressure chambers in the cylinder so that the motor will exert brake applying force when both chambers are pressurized. With this arrangement, a minimal amount of air is exhausted from the system during operation. Also, a stressed spring contained in the cylinder supplements the brake applying force of the air with the result that the cylinder can have smaller diameter than the cylinders in conventional brake actuators. The spring is arranged to provide the parking brake and is further arranged to automatically apply the brakes if pressure is lost from the system.

One form of the invention is shown in the accompanying drawings.

Figure 1:
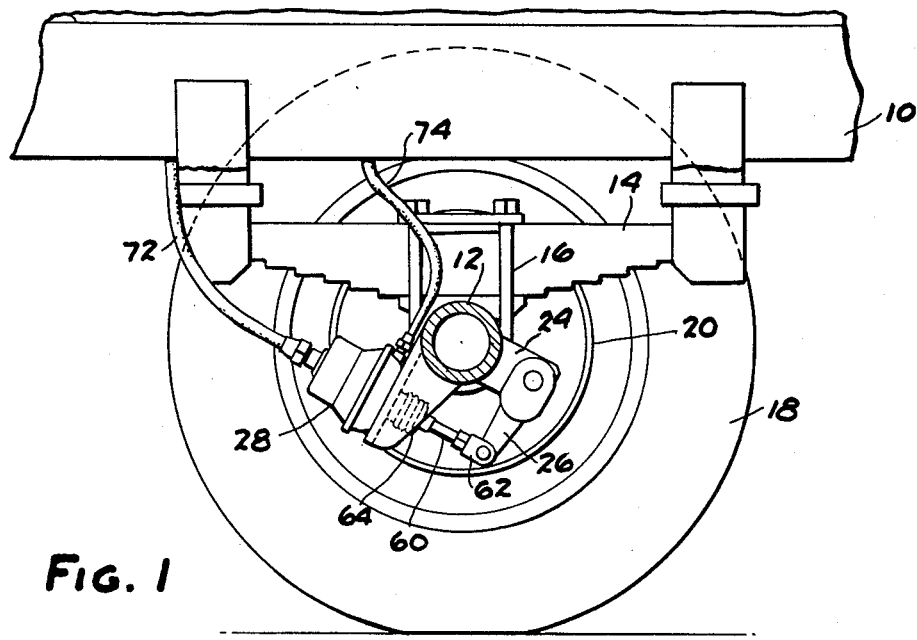
FIG. 1 is a generally elevational view showing a vehicle utilizing a brake operating structure according to this invention.
Figure 2:
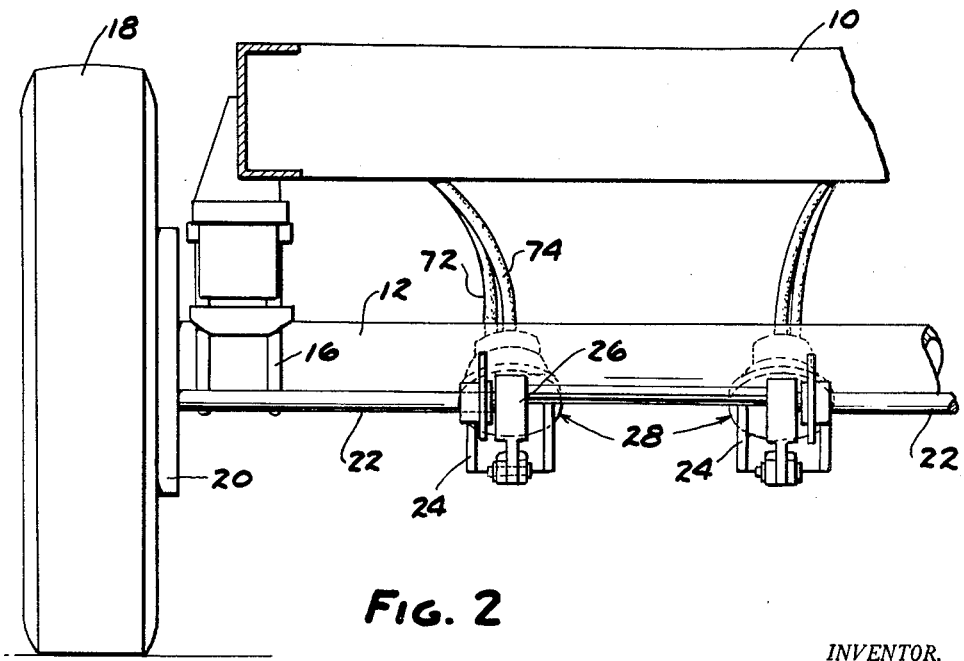
FIG. 2 is generally an end elevation of the arrangement shown in FIG. 1.

Shown in FIG. 1 is a vehicle frame 10 having an axle 12 suspended therefrom through a conventional spring stack 14 and U-bolt connection 16. Ground engaging wheels 18 are mounted on the axle and brakes 20 on the wheels are operated by shafts 22 projecting from the brake backing plates and journaled on axle-supported brackets 24. Shafts 22 are connected to operating levers 26 actuated by braking structures 28 constructed in accordance with this invention and mounted on brackets 24.

Motor 28 comprises a cylinder 30 having a base portion 32 secured to bracket 24 as by bolts 34. The cylinder has a cap portion 36 and between this portion and base 32 is sealingly clamped the outer peripheral portion 38 of a flexible diaphragm of rubber or the like 40 which provides part of a piston 41 within the cylinder. The inner radial portion 42 of the diaphragm is sealingly clamped between two central tubes 44 and 46 projecting centrally into the cylinder interior so that diaphragm 40 divides the cylinder into two sealed pressure chambers 48 and 50.

A cup-shaped element 52 co-operates with diaphragm 40 to complete piston 41. Cup 52 has an outward radial flange 54 which is sealingly secured to diaphragm 40 by bolts 56 and a clamping ring 58. A thrust rod 60 is anchored to the interior central portion of cup 52 and projects through guide tube 46 to the exterior of cylinder 30 for operative connection to brake lever 26 through a clevis 62. A bellows type dirt seal 64 is provided between rod 60 and cylinder 30. The under side of cup 52 is exposed to atmospheric pressure through a clearance 66 provided between guide tube 46 and rod 60, this clearance being sufficient to accommodate lateral movements for rod 60 as may be required by swinging movement of brake lever 26 about its pivot.

The effective area of piston 41 exposed to chamber 48 is determined by the entire diameter of cylinder 30 while the effective area of the piston exposed to chamber 50 is determined by that diameter diminished by the area of the central portion of the piston which is exposed to atmospheric pressure through passageway 66. Chambers 48 and 50 are provided respectively with fittings 68 and 70 having attached air pressure lines 72 and 74 which are connected to a common source of air under pressure such as pressure tank 76.

Valves 78 and 70 are provided respectively in pressure lines 72 and 74 for introducing and exhausting air under pressure to and from chambers 48 and 50. Controls for the valves are represented diagrammatically in FIGS. 5–8 as a foot pedal P and a hand lever L with the dotted lines to the valves representing suitable interposed linkage or circuitry. Three coil springs 82, 84 and 86 are disposed in chamber 48 and are compressed between cup flange 54 and an end wall of cylinder 30. These springs are represented diagrammatically in FIGS. 5–8 as a single spring S.

Figure 3:
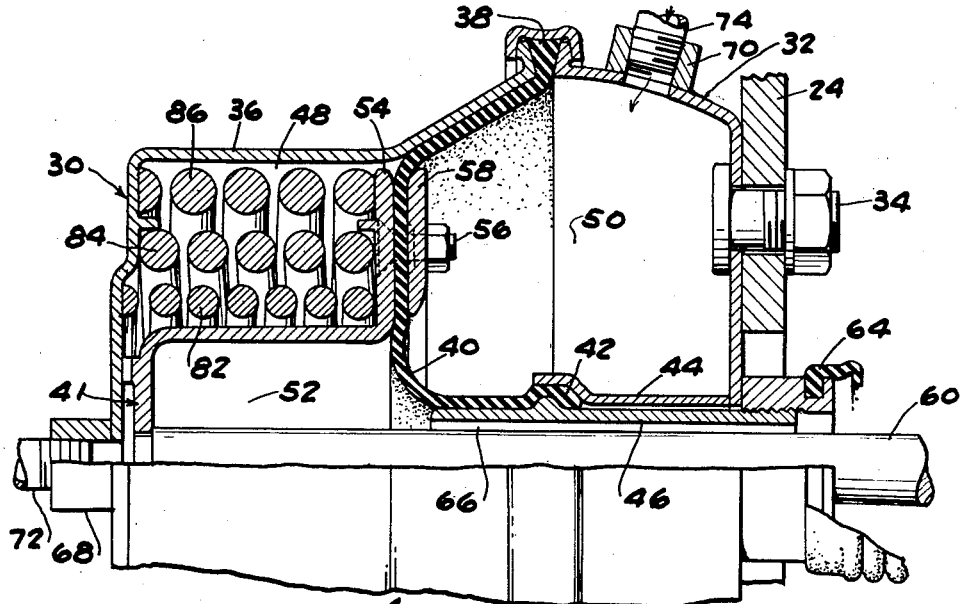
FIG. 3 is an enlarged fragmentary view partly in section and partly in elevation of the brake operating structure.
Figure 5:
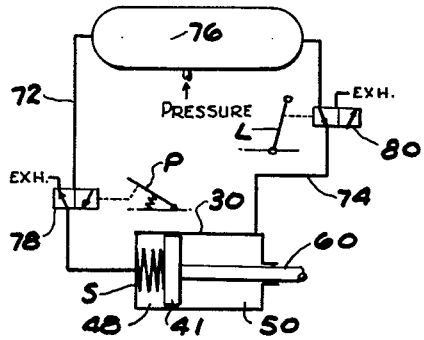
FIG. 5 is a diagrammatic representation of a pneumatic circuit conditioned so that the brake actautor is in brakes-off position.

In use it may be assumed that brake actuator 28 is initially in the brakes-off position of FIGS. 3 and 5 wherein pressure in chamber 48 is atmospheric because valve 78 is at exhaust position and air under pressure has been valved into chamber 50 from pressure tank 76 through valve 80. Piston 41 is held to the left as the drawings are viewed against compressed springs 82, 84 and 86 (spring S) and thrust rod 60 is in its retracted position.

Figure 6:
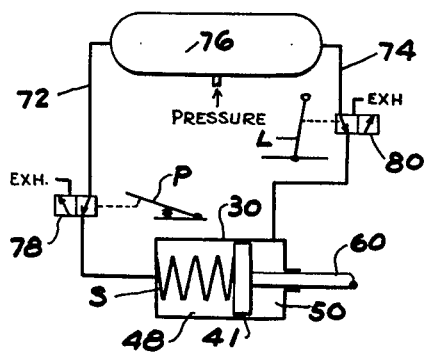
FIG. 6 illustrates the circuit conditioned so that the actuator has applied the service brakes.
Figure 7:
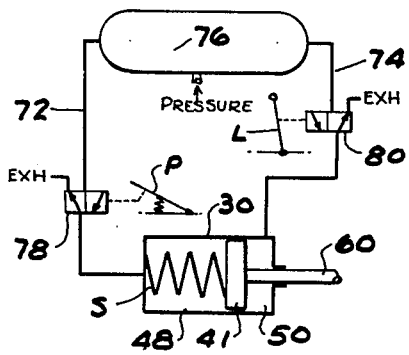
FIG. 7 illustrates the circuit conditioned to apply the parking brake.

To apply the service brakes, the vehicle operator depresses pedal P to shift valve 78 to the FIG. 6 position in which air under pressure is valved into chamber 48 thereby equalizing the pressures on the opposite sides of piston 41. Since the effective area of the piston exposed to chamber 48 is greater than that exposd to chamber 50, the piston will be shifted to the right as the drawings are viewed to advance thrust rod 60 for swinging brake lever 26 to apply the brakes. Compressed spring S exerts motive force on piston 41 which is supplemental to the motive force of the air under pressure.

Figure 4:
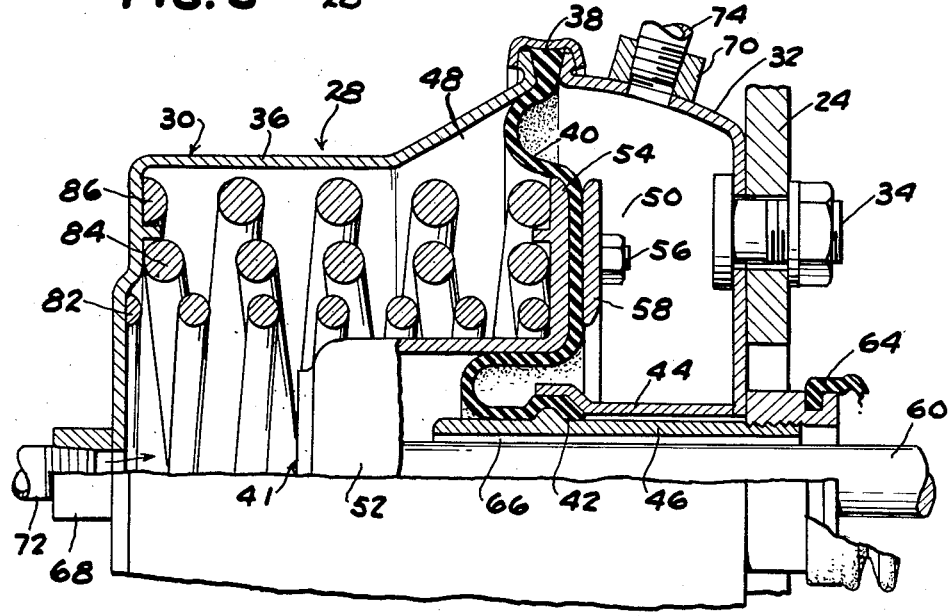
FIG. 4 is a view similar to FIG. 3 but showing the parts in a different position.

Since the compressed spring structure can be made relatively strong as represented by the triple coil spring arrangement in FIGS. 3 and 4, the spring can exert a relatively high brake applying force supplemental to the force of the compressed air and this enables the diameter of piston 41 and of the brake actuator generally to be kept relatively small. For example, in experimental models an overall diameter of about 8½ inches has been found to be adequate. It is contemplated that in more refined models this diameter will be smaller.

To relieve the brakes, the operator releases pedal P to return valve 78 to the exhaust position of FIG. 5 so that the pressure in chamber 48 is relieved whereupon the pressure in chamber 50, which has been maintained, again forces piston 41 to the left against the action of spring S, thereby retracting thrust rod 60 and brake lever 26. It is to be noted that in the cycle of applying and relieving the brakes, no air is exhausted from chamber 50 to the atmosphere. The only air exhausted to the atmosphere was that introduced into chamber 48 in applying the brakes. Thus, in each application and relief of the brakes, a minimal amount of air is lost from the system.

To apply parking brakes, the operator operates hand lever L to shift valve 80 to its exhaust position wherein the air under pressure in chamber 50 is relieved. Thereupon spring S expands and forces piston 41 to the right to advance thrust rod 60 for swinging brake lever 26 to apply the vehicle brakes. To return the brakes to off position, the operator returns lever L to operate valve 80 so that air under pressure is again introduced into chamber 50 from pressure tank 76. This moves piston 41 to the left against the action of spring S, thereby retracting thrust rod 60 and relieving the brakes. Here again, air is exhausted from the system only on one side of piston 41.

Figure 8:
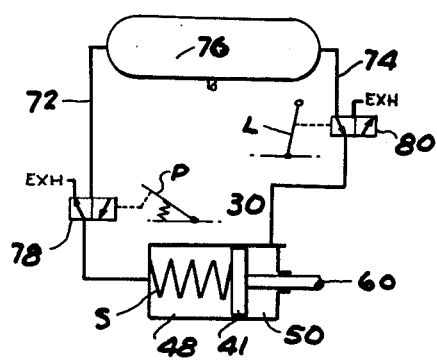
FIG. 8 illustrates the brakes-on position of the actuator when pressure is lost from the circuit.

If the air pressure should be lost entirely from the system or become dangerously low, the brakes will be automatically applied as indicated in FIG. 8. Upon an unusual loss of pressure from the system, the pressure in chamber 50 will lower to the extent that spring S will automatically expand to advance piston 41 and thrust rod 60 to the right thereby swinging brake lever 26 and applying the brakes. The system thus fails safe.

The valving and pneumatic circuitry illustrated in FIGS. 5-8 is illustrative only. The actuator is adapted for use in other types of circuits. For example, instead of equalizing the pressures in chambers 48 and 50 to apply the service brakes, pneumatic circuits might be utilized in which pressure would be partially or fully relieved from chamber 50 and either partially or fully applied in chamber 48. With this arrangement, the diameter of piston 41 and the overall diameter of the actuator may be reduced even further than with the specific circuit illustrated.

When a vehicle is operated in heavy traffic, particularly in city traffic, the brakes are applied frequently and this tends to lower the air pressure in the brake operating system. With the present system, as pointed out above, there is a minimal pressure loss with each application and relief of the brakes, thereby reducing the tendency toward loss of an undesirable amount of pressure. The restraining force of piston 41 on spring S is adequate to permit a considerable pressure reduction in the system before the spring will automatically begin to apply the brakes. At the same time, as long as there is sufficient pressure in the system to restrain spring S, there is also sufficient pressure in the system to apply the service brakes in the normal manner because of the differential effective areas of piston 41.

The exterior physical features and conformation of actuator 28 are such that it can be mounted on conventional vehicular equipment without the necessity of any modifications in either the mounting brackets or brake operating linkage with which the actuator is associated.

I claim:

1. Brake operating structure comprising, a fluid pressure motor having means forming a cylinder, a piston therein, and a sealed chamber on one side of said piston, a thrust rod connected to said piston and extending out of said cylinder for operative connection to vehicle brake applying means, the other side of said piston in the vicinity of said thrust rod being exposed to atmospheric pressure, means providing another sealed chamber surrounding said thrust rod so that the effective area of said piston exposed to said other chamber is smaller than the effective area of said piston exposed to the first mentioned chamber, said piston being operative responsive to introduction of pressure from a source into both of said chambers to exert brake applying force on said thrust rod, a spring engaging an end wall of said cylinder and said piston, said spring being stressed to urge said piston in a direction for applying braking force to said thrust rod, said piston being operative responsive to introduction of fluid under pressure into said other chamber and relief of pressure in the first mentioned chamber to relieve braking force on said thrust rod against the action of said spring, said spring being operable responsive to lowering of fluid pressure in both of said chambers to exert brake applying force on said thrust rod.

2. Brake operating structure comprising, a fluid pressure motor having a cylinder with a flexible diaphragm type piston therein dividing the cylinder into two chambers, a thrust rod on said piston and a generally central guide tube on said cylinder through which the thrust rod extends out of the cylinder for operative engagement with brake operating mechanism, the radially inner portion of said diaphragm being sealingly secured around said tube, and portions of said piston disposed generally toward said tube being exposed to atmospheric pressure such that the effective areas of said piston exposed to said chambers are unequal, a source of fluid pressure, means operable selectively to valve fluid under pressure from said source into said chambers for applying and relieving braking force on said thrust rod, said piston being operative responsive to introduction of fluid under pressure in both of said chambers to exert brake applying force on said thrust rod, a spring engaging an interior wall of said cylinder and said piston and being stressed to urge said piston in a direction for exerting brake applying force on said thrust rod, said piston being operative responsive to introduction of fluid under pressure into one of said chambers to relieve brake applying force on said thrust rod against the action of said spring, said spring being operable responsive to reduction of fluid pressure on both sides of said piston to exert brake applying force on said thrust rod.

3. Brake operating structure comprising, a fluid pressure motor having means forming a cylinder, a piston therein, a first sealed chamber to which one side of said piston is exposed, the other side of said piston having first and second portions, said first portion being exposed to atmospheric pressure, means providing a second sealed chamber to which said second portion of said other side of said piston is exposed, the area of exposure of said one side of said piston to said first sealed chamber being greater than the area of exposure of said second portion to said second sealed chamber, a thrust rod connected to said piston and extending out of said cylinder for operative connection to vehicle brake operating means, said piston being operable responsive to introduction of pressure from a source into both of said chambers to exert brake operating force on said thrust rod, and a spring within said cylinder stressed to supplement the force exerted on said piston by fluid under pressure in one chamber, said spring being yieldable to force exerted on said piston by fluid under pressure in the other chamber when pressure in said one chamber is relieved.

4. The brake operating structure defined in claim 3 wherein said spring is compressed between a wall of said cylinder and said one side of said piston.

References Cited in the file of this patent

UNITED STATES PATENTS

| 2,211,890 | Farmer | Aug. 20, 1940 |
| 2,852,316 | Staley | Sept. 16, 1958 |
| 2,871,827 | Euga | Feb. 3, 1959 |
| 2,962,000 | Alfieri | Nov. 29, 1960 |

FOREIGN PATENTS

| 384,920 | Great Britain | Dec. 15, 1932 |
| 99,242 | Sweden | June 25, 1940 |